Nov. 12, 1935. G. C. PEARCE 2,021,087
REFRIGERATING APPARATUS
Filed Feb. 26, 1934 3 Sheets-Sheet 1

Inventor
George C Pearce
By Spencer Hardman and Fehr
Attorneys

Nov. 12, 1935.   G. C. PEARCE   2,021,087
REFRIGERATING APPARATUS
Filed Feb. 26, 1934    3 Sheets-Sheet 2

Nov. 12, 1935.  G. C. PEARCE  2,021,087
REFRIGERATING APPARATUS
Filed Feb. 26, 1934   3 Sheets-Sheet 3

Inventor
George C Pearce
By Spencer Hardman 2nd Fehr
Attorneys

Patented Nov. 12, 1935

2,021,087

UNITED STATES PATENT OFFICE 2,021,087

REFRIGERATING APPARATUS

George C. Pearce, Dayton, Ohio, assignor to General Motors Corporation, Dayton, Ohio, a corporation of Delaware Application February 26, 1934, Serial No. 712,937

3 Claims. (Cl. 62—4)

This invention relates to refrigerating apparatus and more particularly to control means therefor.

In domestic refrigerating apparatus as at present manufactured, difficulty is encountered when the room temperature or the environment temperature goes below normal room temperatures. When the external or environment temperature is lowered with the control setting remaining the same, the temperature within the food compartment of the refrigerator is likewise lowered to a certain extent. This causes over cooling of the food compartment and may cause freezing of the food stuffs within the food compartment if the external or room temperature is sufficiently low.

It is an object of my invention to prevent the lowering of the temperature within the food compartment under such conditions and to provide a compensating means for the control of the refrigerating apparatus which will compensate for changes in the external temperature and which will maintain the food compartment temperature substantially constant under varying external temperatures.

Recently domestic refrigerators have been provided with automatic defrosting means by which the defrosting of the evaporator is automatically accomplished. It has been desirable to lengthen the defrosting period and to increase the maximum defrosting temperatures when the external temperature is lowered.

It is therefore an object of my invention to provide compensating means for the defrosting means for compensating for changes in external temperature.

Further objects and advantages of the present invention will be apparent from the following description, reference being had to the accompanying drawings, wherein a preferred form of the present invention is clearly shown.

Figure 1:
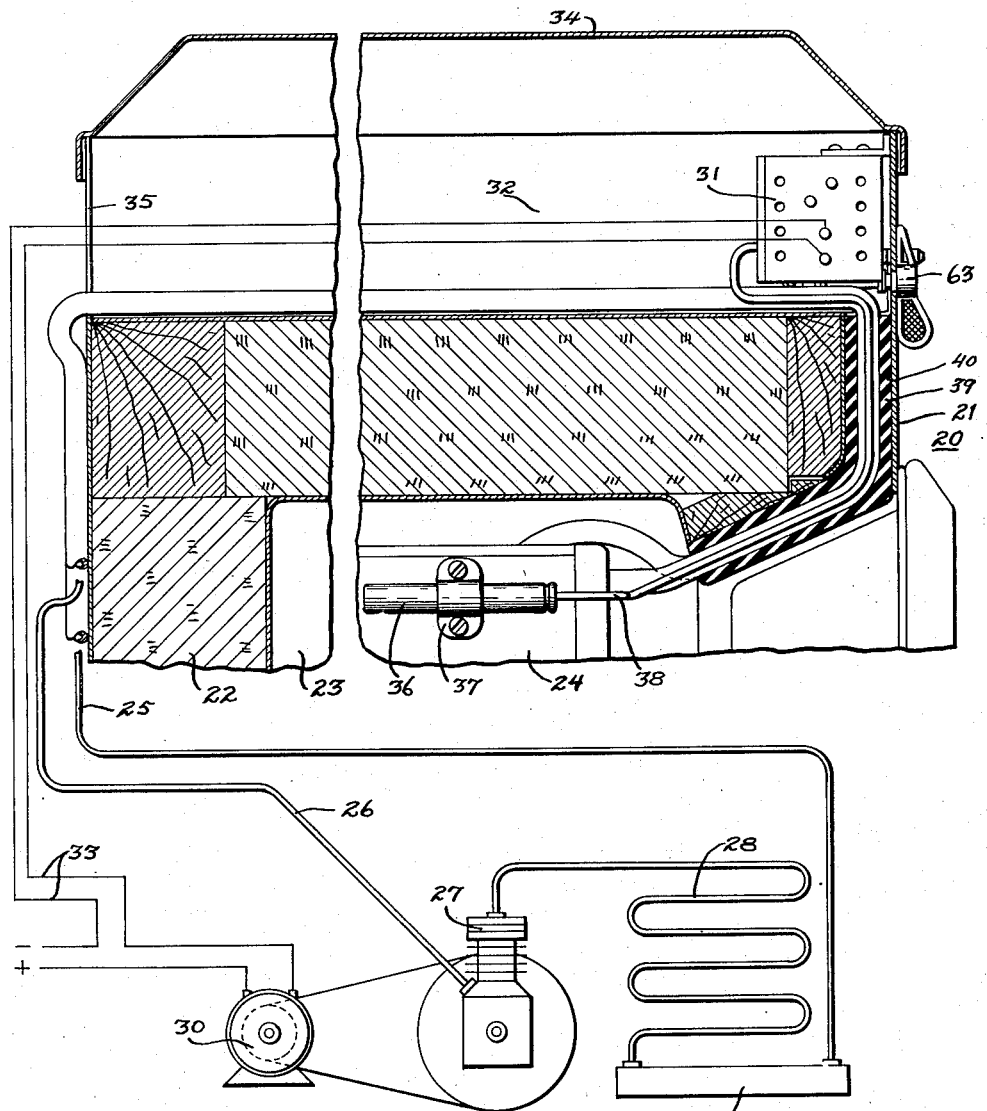
Fig. 1 is a fragmentary vertical sectional view through the upper portion of a refrigerator cabinet, together with the control means and refrigerating system embodying my invention.

Referring to the drawings and more particularly to Fig. 1, there is shown a refrigerator 20 including a cabinet 21 provided with insulated walls 22 enclosing the food compartment 23 containing a refrigerant evaporator 24 which is connected by a liquid refrigerant supply conduit 25 and an evaporated refrigerant return conduit 26 to a refrigerant liquefying means including a compressor 27 for compressing the refrigerant and for forwarding the compressed refrigerant to a condenser 28 where the refrigerant is liquefied and collected in the receiver 29. The compressor 27 is driven by an electric motor 30 supplied with electric energy through an electric circuit 33 under the control of a control switch means 31 located within a ventilated compartment 32 which is provided above the food compartment 23 by the removable cover 34. The rear wall of this compartment is provided with an opening 35 which permits the circulation of external air within this compartment. The control means 31 is operated by a thermostatic bulb 36 which is fastened to a portion of the evaporator 24 by means of a bracket 37. This thermostatic bulb 36 is connected to the control means by tubing 38 which passes along with the supply and return conduits 25 and 26 through a rubber tube 39 located in the passage 40 which connects the food compartment 23 with the front portion of the ventilated top compartment 32.

With this apparatus the refrigerating apparatus including the motor 30 and compressor 27 operates until the temperature of the evaporating means is lowered to a predetermined low temperature. At this time the control means opens the electric motor circuit and stops the operation of the refrigerating apparatus. During this idle period the evaporator absorbs heat from the food compartment and gradually has its temperature raised so that it finally reaches a predetermined temperature which causes the thermostatic bulb 36 to cause the control means 31 to close the electric motor circuit and again cause the operation of the apparatus.

Changes in the temperature of the food compartment affect the temperature of the evaporator so that by controlling the temperature of the evaporator the temperature of the food compartment is also controlled. Inasmuch as the evaporator is provided with means for freezing ice and desserts, it has been found most satisfactory to control the operation of the refrigerating system by the evaporator temperature. This control, however, does not take into account changes in external temperature and therefore if the external temperature should fall considerably the same amount of refrigeration will be supplied to the food compartment since the evaporator is kept at substantially the same temperature. This will cause the temperature within the food compartment to be lowered because of the fact that less heat leaks through the walls of the cabinet and therefore less refrigeration is required to maintain a proper temperature.

I prevent this by providing a compensating means within the control means for compensating for variations in external temperatures.

Figure 2:
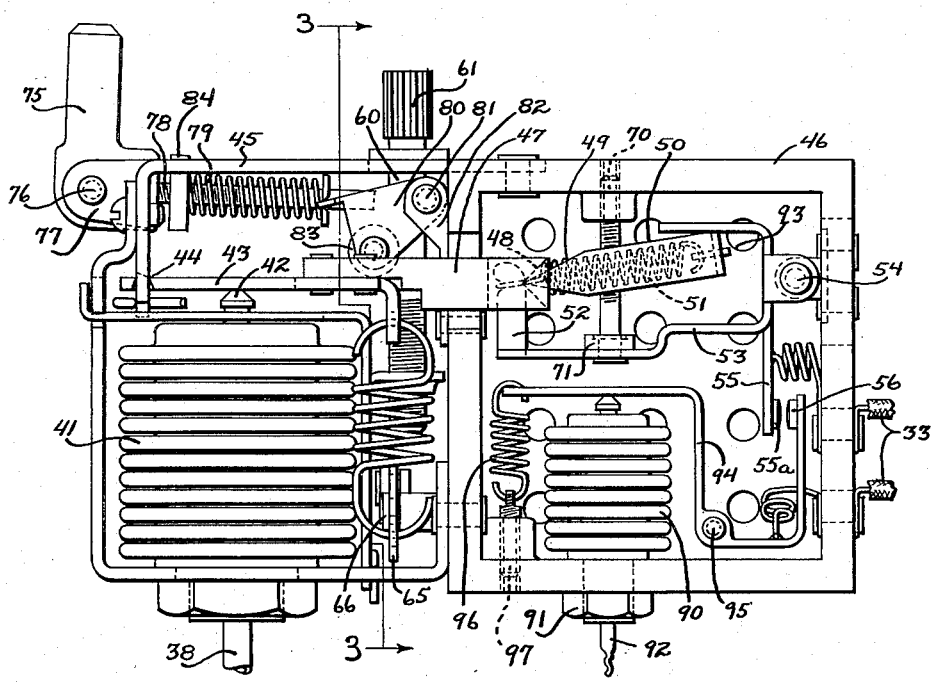
Fig. 2 is a top view of the control means shown in Fig. 1.
Figure 3:
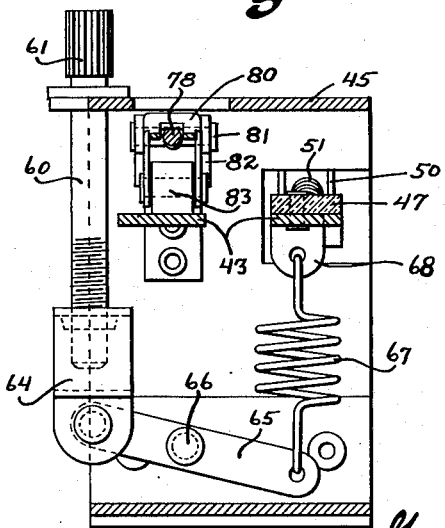
Fig. 3 is a sectional view along the line 3—3 of Fig. 2.

Referring now more particularly to Figs. 2 and 3 for details of one form of my control means, there is shown a metal bellows 41 which is connected to the thermostatic bulb 36 by the tubing 38. The upper or movable end of this bellows is provided with a conical point 42 which engages a main lever 43 which is pivoted at 44 to a bracket 45 which is fastened to and supported by an insulating housing 46. The lever 43 is provided at its free end with an insulating arm 47 having a pair of V-shaped notches 48 at its outer end which receive the knife edges 49 of a U-shaped secondary lever 50. The yoke portion of the U-shaped secondary lever 50 is connected by a toggle spring 51 to an upstanding post 52 formed upon an irregularly shaped contact lever 53 which is pivoted by a pin 54 to the housing 46.

The contact lever 53 is provided with a contact arm 55 provided with a contact 55a adapted to engage a cooperating contact 56 to open and close the electric motor circuit 33. The contact arm 55 and the contact 56 are each connected by a pigtail connection to the electric circuit 33. The main lever 43, together with the secondary lever 50, the toggle spring 51, and the contact lever 53 form a double toggle snap acting switch mechanism.

In order to provide different evaporator temperatures for dessert freezing, I provide a temperature regulating means including a temperature regulating screw 60 provided with a serrated head 61 at its upper end which receives a manual control knob and pointer 63 which serves to indicate different freezing speeds and temperatures of the evaporator. The temperature regulating screw has a threaded link 64 upon its threaded end which is connected to a cross lever 65 pivoted at its midpoint upon a pin 66 fixed to the housing 46. The opposite end of this lever is connected to the lower end of the tension type tension regulating spring 67 which is connected at its upper end to an ear 68 depending from the main switch lever 43. By turning the temperature regulating screw 60 in one direction or the other, both the opening and the closing points of the switch are raised or lowered. This is called the range adjustment.

I also provide a differential adjustment for varying the cut-in or closing point or temperature of the switch. This is provided by the differential adjusting screw 70 which is threaded within the front wall of the insulated housing 46 and which extends downwardly and contacts with insulated portion 71 which extends from the contact lever 53. This differential screw 70 determines the position of the contact lever 53 when in open circuit position. Inasmuch as the switch does not snap to closed position until the main lever moves the secondary lever 50 into alignment with the toggle spring 51 and a slight additional amount beyond the point of alignment this differential screw 70 by controlling this position of the contact lever controls the angularity of the secondary lever 50 at the time of tripping and this controls the cut-in point of the switch independently of the cut-out or opening of the switch. This differential adjustment controls the upper temperature limit of the evaporator of the refrigerating system.

I also provide an automatic defrosting mechanism including a finger manipulator 75 which is pivoted by a pin 76 to an ear 77 extending from the bracket 45. The finger manipulator 75 is provided with a threaded rod 78 which carries a toggle spring 79 of a compression type which is provided with a pivotal connection with a toggle lever 80 pivoted upon the pin 81 carried by the bracket 82 fastened to the insulating housing 46. This toggle lever 80 is provided with a roller 83 which when the finger manipulator 75 is moved to defrosting position contacts the upper surface of the main lever 43. The toggle compression spring 79 and the toggle lever 80 form a toggle mechanism which when in its lower position exerts an additional resistance to the upward movement or switch closing movement of the switch arm 43 so as to make it necessary that a higher temperature exists in the evaporator 24 before sufficient pressure is transmitted from the thermostat bulb 36 to the bellows 41 to overcome this additional resistance and to move the switch to closed circuit position. The tension of this compression toggle spring 79 is controlled by the nut 84 which is threaded upon the rod 78. When sufficient pressure exists in the metal bellows 41, the switch arm 43 will move upwardly to the closed circuit position and at the same time will automatically move the toggle defrosting mechanism to its upper or inactive position to terminate the defrosting cycle and to resume normal operation of the refrigerating system.

In order to compensate the defrosting mechanism as well as the control mechanism and the refrigerating system for variations in external or environment temperature, I have provided a compensating means in the form of a metal bellows 90 charged with a volatile fluid or refrigerant which is fastened at one end to a wall of the insulating housing 46 by a nut 91 and which is provided with a charging tube 92. If desired, this charging tube may be connected to a thermostatic bulb exposed to the external or environment temperature. However, I have found it sufficient to provide the opening 35 in the ventilated compartment 32 and openings 93 within the housing 46 so that external air may circulate through the housing 46, thus causing the temperature of the metal bellows 90 to assume the temperature of the external air.

The metal bellows 90 is provided with a conical point at its upper end which engages a compensating lever 94 which is pivoted upon a pin 95 fixed to the housing 46. The lever 94 is held upon the conical point by a tension type adjusting spring 96 which is connected at its opposite end to an adjusting screw 97 which is threaded into the housing 46. The opposite end of the lever 94 carries the contact 56. By moving the contact 56 toward the contact 55a when the temperature of the metal bellows 90 and the temperature of the external air becomes lower, the opening or cut-out point of the switch and the lower temperature limit of the evaporator of the refrigerating system is raised in a manner corresponding to the adjustment of the differential screw 70. The metal bellows 90 is charged with a volatile fluid of such characteristics and the regulating spring 96 is so adjusted that the compensation is sufficient to maintain the food compartment at a proper temperature when the external temperature is lowered.

Figure 4:
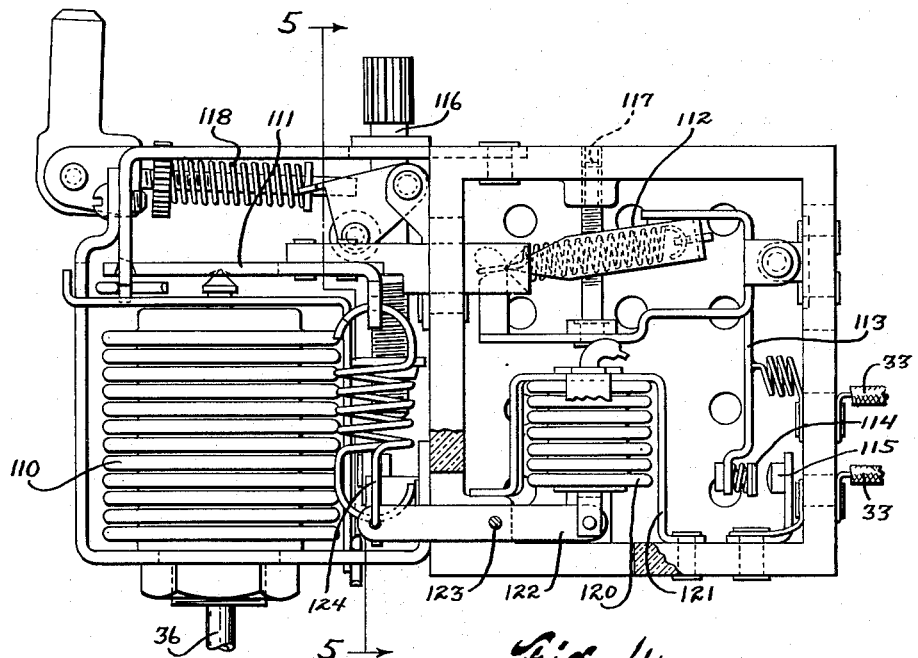
Fig. 4 is a top view of a modified form of my improved control means.
Figure 5:
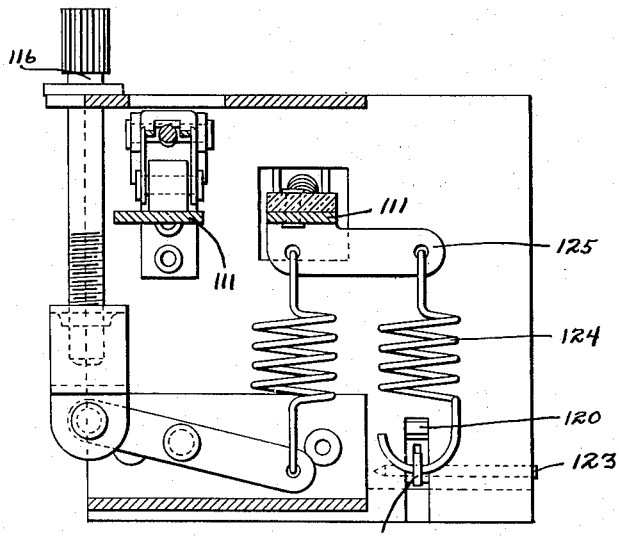
Fig. 5 is a sectional view along the line 5—5 of Fig. 4.

In Figs. 4 and 5, there is shown another form of my invention. In this form there is similarly provided a metal bellows 110 connected to the thermostatic bulb 36 which operates a main lever 111 and a double toggle snap acting mechanism 112 which operates a contact lever 113 to open and close the switch contacts 114 and 115. The switch is also provided with a range or temperature regulating adjusting screw and mechanism 116 as well as a differential adjusting screw 117. A defrosting mechanism of the toggle type designated by the reference character 118 is also provided. All this mechanism is substantially identical to that shown in Figs. 2 and 3 and described in detail in the preceding paragraphs.

The switch and the refrigerating system is compensated for changes in room temperature by a metal bellows 120 supported by a bracket 121, which bellows is connected to a lever 122 which is pivoted at its mid point upon a pin 123. The opposite end of this lever is connected to the lower end of the tension type compensating spring 124 connected at its upper end to an arm 125 extending from the main lever 111. As the temperature of the external air is lowered, the volatile fluid within the bellows 120 contracts, thus contracting the bellows 120 and causing the lever 122 to pivot in a counterclockwise direction about its pivot point 123 to exert an additional tension on the compensating spring 124 so as to raise both the cut-in and cut-out points of the switch and the upper and lower temperature limits of the evaporator of the refrigerating system. Thus, in this form, I have provided a range compensation for external temperatures, while in the form shown in Figs. 2 and 3, I have provided compensation for external temperatures by changing the differential and particularly by raising the lower limit or cut-in point. This compensating means not only compensates for the normal operation of the switch in the different temperature regulating positions, but also compensates the defrosting mechanism.

While the form of embodiment of the invention as herein disclosed, constitutes a preferred form, it is to be understood that other forms might be adopted, all coming within the scope of the claims which follow.

What is claimed is as follows:

1. Refrigerating apparatus including an insulated cabinet having a compartment to be cooled, a cooling means in heat exchange relation to said compartment to be cooled for cooling said compartment, compressing and condensing means for supplying cooling medium to said cooling means, means dependent upon the temperature of the cooling means for controlling said compressing means to normally maintain said cooling means at freezing temperatures, auxiliary means for temporarily providing temperatures of the cooling means above freezing and thereafter resuming the normal temperature control of the cooling means, and means responsive to temperatures outside of said compartment for regulating the temperatures provided by the auxiliary means.

2. Refrigerating apparatus including an insulated cabinet having a compartment to be cooled, a cooling means in heat exchange relation to said compartment to be cooled for cooling said compartment, compressing and condensing means for supplying cooling medium to said cooling means, means for starting and stopping the compressing means according to predetermined high and low temperature limits of the cooling means, and means responsive to temperatures outside of said compartment for regulating one of the temperature limits without affecting the other temperature limit.

3. Refrigerating apparatus including an insulated cabinet having a compartment to be cooled, a cooling means in heat exchange relation to said compartment to be cooled for cooling said compartment, compressing and condensing means for supplying cooling medium to said cooling means, means for starting and stopping the compressing means according to predetermined high and low temperature limits of the cooling means, and means responsive to temperatures outside of said compartment for regulating the temperature limit at which the compressing means is stopped without affecting the temperature limit at which the compressing means is started.

GEORGE C. PEARCE.